United States Patent [19]

Risley

[11] Patent Number: 5,286,290
[45] Date of Patent: Feb. 15, 1994

[54] FILLER AND ARTIFICIAL STONE MADE THEREWITH

[75] Inventor: Lon F. Risley, Banning, Calif.

[73] Assignee: Avonite, Inc., Belen, N. Mex.

[21] Appl. No.: 868,942

[22] Filed: Apr. 16, 1992

[51] Int. Cl.$^5$ .............................................. C09C 1/40
[52] U.S. Cl. ........................ 106/401; 106/400; 106/402; 106/18.26; 252/609; 423/629
[58] Field of Search .................. 106/18.26, 400, 401, 106/402; 252/609; 423/629

[56] References Cited

U.S. PATENT DOCUMENTS

| | | | |
|---|---|---|---|
| 650,757 | 5/1900 | Julius | 106/402 |
| 714,687 | 12/1902 | Fourneaux | 106/402 |
| 2,378,155 | 6/1945 | Newsome et al. | 423/628 |
| 3,488,246 | 1/1970 | Duggins | 428/15 |
| 3,632,395 | 1/1972 | Dyson | 106/402 |
| 3,847,865 | 11/1974 | Duggins | 524/437 |
| 4,062,693 | 12/1977 | Berger | 106/481 |
| 4,084,983 | 4/1978 | Bernhard et al. | 106/402 |
| 4,085,246 | 4/1978 | Buser et al. | 428/220 |
| 4,105,465 | 8/1978 | Berger | 106/481 |
| 4,159,301 | 6/1979 | Buser et al. | 264/331 |
| 4,323,554 | 4/1982 | Bernhard | 106/402 |
| 4,413,089 | 11/1983 | Gavin et al. | 524/785 |
| 4,523,953 | 6/1985 | Paffoni et al. | 106/430 |
| 4,842,772 | 6/1989 | Withiam | 252/601 |
| 4,961,995 | 10/1990 | Ross et al. | 428/409 |
| 4,968,351 | 11/1990 | Ahmed et al. | 106/402 |
| 5,074,917 | 12/1991 | Persello | 106/402 |

OTHER PUBLICATIONS

Oxides and Hydroxides of Aluminum, Alcoa Technical Paper No. 19, Revised; Wefers and Misra, Alcoa Laboratories, 1987, pp. 1–15.

*Primary Examiner*—Mark L. Bell
*Assistant Examiner*—Scott L. Hertzog
*Attorney, Agent, or Firm*—William L. Krayer

[57] ABSTRACT

Alumina trihydrate is dehydrated and rehydrated with a solution of dye, then dried to make colored alumina trihydrate which is distributed in a resin matrix to make solid decorative materials, such as artificial granite having excellent fire retardance.

20 Claims, No Drawings

FILLER AND ARTIFICIAL STONE MADE THEREWITH

TECHNICAL FIELD

This invention relates to materials having the appearance of minerals, and to fillers therefor and methods of making the fillers. More particularly, it relates to alumina, methods of treating it to color it throughout, and making synthetic mineral appearing materials employing such alumina.

BACKGROUND OF THE INVENTION

As is known in the art, alumina trihydrate ("ATH") contains about 34.6% by weight chemically bonded water of hydration which acts as a heat sink, thus retarding ignition and combustion of materials in which it is incorporated. During combustion of such materials, the water tends to evolve as steam, absorbing energy for the conversion of the water phase, inhibiting flame spread, limiting the accessibility of oxygen, and suppressing smoke development.

ATH is therefore commonly used as a filler and flame retardant in synthetic "solid surface" materials such as are used for kitchen countertops and other architectural and furniture applications. The alumina trihydrate may be incorporated in resin matrices of various composition, such as disclosed in Buser's U.S. Pat. Nos. 4,085,246 and 4,159,301, or it may be encased in resin particles which are employed as part of granite or other synthetic mineral appearing patterns. In the latter case, the encasement is accomplished by first preparing a mixture of ATH, pigment or dye and resin such as polyester, then curing or hardening the resin incorporating the ATH, and then crushing or grinding the hardened "ingot" to obtain colored particles which can then be used to impart decorative patterns and flame retardancy in a further mixture with hardenable resin such as polyester or polymethylmethacrylate. See Ross and Risley U.S. Pat. No. 4,961,995. The ATH is not colored, however, (cf Duggins U.S. Pat. No. 3,847,865) and typically is quite small so that the particles are not readily discernible in the desired mineral pattern. The speckled appearance of a granite pattern, for example, is usually imparted by relatively large (that is, visually discernible) particles of colored resin, which may or may not have ATH in them.

The amount of ATH which can be incorporated in a mineral-appearing material is limited in the above procedures by the necessity of coloring the particles. Also, ATH particles large enough to be visible in a mineral pattern have generally not been employed because when the surface (such as a kitchen countertop) is sanded or polished, the ATH particles near the surface will also be sanded or polished, and the appearance of their uncolored interiors thereby exposed is generally not compatible with the desired visual effect. A similar phenomenon known as "white-capping" is observable from scratching or abrasion of the finished synthetic material, wherein the colored resin encasement is removed and exposes the relatively white ATH. See Gavin et al U.S. Pat. No. 4,413,089, referring to this phenomenon as "scratch white" in column 2, lines 7-12.

So far as I am aware, colored ATH particles suitable for use in making mineral-appearing resin materials have not been previously made. The above-mentioned Gavin patent, for example, uses iron oxide to impart color to a polymethylmethacrylate article filled with ATH. Colorants, dyes, pigments, and lakes, organic and inorganic, soluble and insoluble, are discussed extensively in Duggins U.S. Pat. No. 3,488,246 without hinting that a water-soluble dye could be incorporated into ATH by a rehydration procedure. ATH which has been incorporated with dye has not been used to make simulated marble, granite or other mineral product, so far as I am aware.

U.S. Pat. No. 2,378,155 to Newsome and Derr describes a process of making an adsorbent alumina from a gelatinous aluminum hydroxide and goes on to say that the adsorbent alumina, which is calcined, can be impregnated with "various substances." See page 2, column 1, lines 3-16. The statement is made, however, without reference to coloration of hydrated alumina for the purpose of making synthetic minerals or any other purpose, or to the particle size, or to the possibility of a beginning material which is ATH of the type widely used commercially today.

A paper authored by P. V. Bonsignora and J. H. Manhart of Aluminum Company of America and presented at the 29th conference of the Society for the Plastics Industry in 1974 demonstrates that through thermogravimetric analysis it is possible to confirm that water evolution from decomposing alumina trihydrate becomes significant at about 230° C. and is greater than 80% complete at 300° C. At about 300° C. (for about eighty minutes) approximately 80% of the water of hydration is driven off; the last 20% is more difficult to remove. If more than an additional 5% is removed (i.e. the hydration is reduced from 20% to 15%), the crystalline structure of the alumina may become permanently altered so as to prevent rehydration in the manner as to reconstitute alumina trihydrate.

SUMMARY OF THE INVENTION

My invention provides that alumina trihydrate ("ATH") of one or more desired sizes is first dehydrated (reduced significantly in hydration, as explained below) by the application of heat and then treated with an aqueous solution or slurry of dye or pigment at a temperature of about 25° C. to about 99° C. so that the dye or pigment is absorbed along with the water; the particles are then removed from the remaining solution and dried to obtain colored ATH particles. On examination, it is found that the particles are colored throughout, so that if a particle is sliced, the interior color will be seen to be approximately the same as the surface color.

Such colored ATH particles may be chosen to create a synthetic mineral or other effect when incorporated into a liquid resin matrix subsequently cured or otherwise hardened. The liquid resin matrix may be cast on a flat surface for curing or may be otherwise formed into a desired shape such as a sink. The particles may be of different sizes for different colors, and/or have preselected ranges for each. They may then be distributed throughout the resin matrix evenly or in desired patterns as is known in the art for other colored particulates.

My invention makes possible the incorporation of higher concentrations ("loadings") of flame retardant ATH than has heretofore been possible where a certain quantity of resin particles has been deemed necessary for esthetic effects. In other words, the flame retardant ATH itself imparts the desired patterns and there is no necessity for other, primarily resin, particles to create an aesthetic visual effect, although, of course, they are compatible and may be used together with my ATH particles. Thus it may be said that my invention, on one hand, makes possible the incorporation into a synthetic marble, granite or other mineral a higher percentage of flame-retarding ATH than has heretofore been possible, and, on the other hand, makes possible the use of significant percentages of other, non-flame-retardant particles or reinforcing materials (such as resin particles, frit, minerals, calcium compounds, ATH, glass, silica, metals, pearlescent materials, clays, and the like) to impart various properties or appearances while still achieving a desired degree of flame retardancy with a somewhat lower percentage of ATH.

The invention incidentally significantly reduces the undesirable emission of styrene and other monomers which may be released to the atmosphere during manufacture of a mineral-appearing solid surface material—first by completely eliminating the step of making the resin particles encasing ATH, and, second, by reducing the volume of matrix resin as a consequence of the ability to increase the loading of ATH. My invention also eliminates economic waste and disposal problems generated in the ingot manufacture process discussed above. In completely eliminating the ATH encasement step, it eliminates the generation of unusable fines which are almost unavoidably made in the grinding or crushing or the ingots.

DETAILED DESCRIPTION OF THE INVENTION

My invention will be described with reference to certain experiments and demonstrations described in the following paragraphs.

EXAMPLE 1

Three mixtures of ATH particles ranging in size from 1 micron to about 0.125 inches were baked for one hour at temperatures ranging from about 230° to about 287° C. They were removed and weighed and found to have lost water to the extend of 19.23%, 22.22%, and 21.19% of their weight, respectively. Two dye solutions were made up of the following:

|  | A | B |
|---|---|---|
| Water soluble pigments | 2.5% | 2.5% |
| Propylene Glycol | 10.0 | 8.0 |
| Water | 87.5 | 87.5 |
| Triethyl Phosphate | — | 2.0 |

Portions of the three batches of dehydrated particles were then placed in aliquots of the solution preheated to a temperature between about 93° and 99° C., and agitated slowly and intermittently for about ten minutes. The excess dye solution was decanted and the particles were spread on a drying rack and dried at temperatures of about 65° to about 82° C. Weigh-back analysis revealed that based on the original weight, the following weights regained, in the case of dye solution A:

| X | Y | Z |
|---|---|---|
| 20.488% | 21.059% | 21.832% |

For dye solution B, the weigh-back analyses were 20.895, 21.479, and 21.959 for the three samples. The slightly higher values were possibly due to the inclusion presence of triethyl phosphate, which does not volatilize at the temperatures used and may have remained in the ATH.

This represents virtually a total regain of the water of hydration previously removed. On observation by macro- and microscopic magnification, it was apparent that the dye had been carried into the interior of the particles and colored the entire body of the particle by both solutions.

Particles from each of the samples were used to make solid articles by casting them in a conventional polyester resin of a conventional isophthalic/polyol formulation. It was noted that while about 50–53% by weight particles of polyester filled with ATH had been used typically to make a conventional granite-appearing product, about 70–80% by weight colored ATH made by the above process were used to make a product of a similar appearance. There are several reasons for this—first, ATH by itself is more dense than a resin particle which encases smaller particles of ATH; therefore the same volume of ATH weighs considerably more than the prior art particles. Second, use of ATH alone rather than resin-encased ATH (or resin only) for the particles means that a lesser portion of the overall volume of a densely-packed final product is resin and a reciprocal amount can be ATH. Third, ATH particles tend to be less irregular than polyester or other resin particles which have been crushed or ground; accordingly they pack more densely. Excellent flame retardancy results can be obtained because of the high ATH loading. However, excellent flame retardancy results can be obtained without ATH loadings of 75% or 80%. But a major advantage of my invention is that it is now possible to make an attractive solid surface material with test results of zero flame spread and/or zero smoke, using 70% or more ATH, all of which can be colored.

EXAMPLE 2

Three different samples of ATH were dehydrated as in Example 1 and rehydrated with solutions as follows:

|  | A | B | C |
|---|---|---|---|
| Water soluble pigment | 2.5 (red) | 3.0 (black) | 1.5 (white) |
| Propylene Glycol | 10.0 | 9.5 | 10.0 |
| Water | 87.5 | 87.5 | 88.6 |

The different pigments and colors provide varying intensities; the uses may vary concentrations to achieve shades from pastel to deeper colors, depending on the particular dye chosen.

EXAMPLE 3

Five different castings were made with the ingredients shown below:

| Article | A | B | C | D* | E |
|---|---|---|---|---|---|
| Polyester | 20.0 | 20.0 | 20.0 | 30.0 | 25.0 |
| Dyed ATH | 80.0 | 68.0 | 65.0 | 30.0 | 65.0 |
| PE filler | — | 12.0 | — | 30.0 | 65.0 |
| ATH (non-dyed) | — | — | 10.0 | 5.0 | — |
| Fiber | — | — | — | — | 10.0 |
| Mineral Filler | — | — | 5.0 | 5.0 | — |

*The polyester in this formulation included a chlorinated component.

Alumina trihydrate, ($Al_2O_3 \cdot 3H_2O$), also known as hydrated alumina, "hydrate, alumina", ATH and alumina hydroxide, occurs naturally as gibbsite or hydrargyllite and is sometimes referred to as bayerite (or as the product of the bayerite process) when it is made during the processing of bauxite. I may use any of the forms of commonly commercially available ATH or other hydrated alumina. The main criterion for my purposes is that after dehydration or reduced hydration, the alumina should be able to pick up from about 10% to about 25% water (based on the original ATH). Dehydration of ATH may be conducted in any effective manner. A preferred way is to heat the ATH at about 180° C. to about 290° C. for about 45 minutes to about 90 minutes; however, the use of high velocity air during the baking process will efficiently remove the water of hydration and may reduce the time to as little as 15 minutes or less depending on the overall efficiency of the process, the amount of ATH treated, its packing, the air ciruclation and contact, and other factors apparent to workers in the art. Temperatures lower than 180° C. may be operable as well, but will greatly increase the time required and may be undesirably inefficient.

In addition to or instead of dehydrated ATH as a starting material for impregnation, I may use alumina monohydrate, alumina dihydrate, or mixtures thereof; alumina having less than one water of hydration are suitable if they are capable of picking up at least 1.5 moles of water.

Particle sizes of ATH may range from one micron to well over a centimeter.

As colorants, I may use virtually any water soluble dye or pigment. Examples are legion and known in the art of solid surface materials. For solid surface materials which come into contact with food, one may wish to use FDA-cleared dyes, although there is little or no chance that the colorant will leach out of the ATH and/or through the resin matrix. Concentrations in solution may range from 0.5 to 3%; higher concentrations are harmless but usually are not necessary and may be uneconomical. I use propylene glycol to stabilize the dye; however, it is not necessary; instead of propylene glycol I may use nothing at all (only water), or dipropylene glycol, ethylene glycol, diethylene glycol or similar polyols. If subtle differences in natural shades of ATH are observed, it may be desirable to correlate the concentration of dye with the final color of the ATH.

Preferred time/temperature criteria (ranges) for the dehydration step are 45-90 minutes at 180° to 290° C.

Residual hydration of ATH after the dehydration step may range from about 10% to about 25% based on the original ATH. One may achieve a desired intensity or depth of color by passing the ATH through more than one cycle of dehydration and rehydration with a colorant solution, which may be the same or different. Also, interesting effects may be achieved by the use of fluorescent dyes alone or as one of a plurality of colorant treatments.

The time/temperature/concentration criteria (ranges) for the impregnation step are 2 to 10 minutes (or more) at ambient temperature to 99° C. at 0.5-3.0% (or more).

Particle sizes for use in making mineral-appearing materials are 1 micron to 1.27 cm or more. Larger sizes of ATH do not exhibit materially reduced ability to absorb color throughout.

The particles may be further treated to improve binding to the matrix material by using coupling agents, monomer coatings, silanes, and/or prepolymers, as is known in the art.

As matrix resins, I may use, for example, ortho or iso polyesters, including halogenated polyesters, acrylics, or polycarbonates. The matrix may be either thermoplastic or thermosetting.

Compatible insert (inorganic) fillers (and pigments) are glass, glass frit, silica, fumed silica, ground stone, powdered metals, alumina monohydrate, zirconium salts, calcium compounds, uncolored alumina trihydrate, milled fibers, milled glass frits, and the like.

Compatible particulate resin fillers are (any class of polyesters, acrylics, thermoplastics, polycarbonates, and recycled plastics of any kind).

Thus it will be seen that my invention comprises several aspects: (1) a new ATH composition which is ATH having a dye absorbed throughout its structure; (2) as an article, an ATH particle of certain dimensions having the composition 1; (3) the method of making the composition 1; (4) the method of making the particle 2; (5) a flame-retarded resin composition including a component of the composition 1; (6) a flame-retarded resin composition including colored ATH as well as one or more fillers as recited above, and (7) articles made from the resin compositions 5 and 6. The articles (7) may be in the form of sheet or slab for kitchen countertops or decorative architectural surfaces or facades, or molded to artistic shapes in three dimensions.

I claim:

1. Method of making alumina trihydrate having a colorant incorporated therein comprising hydrating an alumina having less than three moles of water of hydration in the presence of a water-soluble colorant and in the absence of a laking aid.

2. Method of making alumina trihydrate particles colored throughout comprising hydrating particles of alumina having less than three moles of water of hydration in the presence of a water-soluble dye and in the absence of a laking aid.

3. Alumina trihydrate having a colorant incorporated therein made by the method of claim 1.

4. Alumina trihydrate of claim 3 wherein the colorant is present as a residue after rehydration of the alumina trihydrate with an aqueous colorant solution.

5. Alumina trihydrate particles colored throughout made by the method of claim 2.

6. Particles of claim 5 having dimensions of about one micron to about 0.127 cm.

7. Method of claim 1 wherein the alumina having less than three moles of water of hydration is made by heating alumina trihydrate.

8. Method of claim 1 wherein the alumina having less than three moles of water of hydration weighs about 19% to about 23% less than alumina trihydrate.

9. Method of claim 1 wherein the hydration step is conducted in the presence of an aqueous solution of dye.

10. Method of claim 9 wherein the aqueous solution comprises about 0.5% to about 3.0% dye.

11. Method of claim 9 wherein the hydration step is conducted at a temperature from ambient to about 99° C.

12. Method of making colored alumina trihydrate comprising (a) dehydrating alumina trihydrate, and (b) rehydrating the resulting dehydrated alumina by immersing it in an aqueous solution of a water-soluble dye at about 20° C. to about 99° C. for a time sufficient to absorb at least about 75% of the water removed in step (a), whereby the dye is incorporated into the alumina trihydrate.

13. Method of claim 12 followed by drying the alumina.

14. Method of claim 12 wherein the residual hydration in the alumina (the percentage of the original water) after step (a) is about 15% to about 25%.

15. Method of claim 12 wherein the rehydration step (b) achieves complete hydration of the alumina while incorporating about 0.5% to about 25% dye.

16. Method of claim 12 wherein the dye solution of step (b) includes about 2% to about 10% of a polyol selected from the group consisting of propylene glycol, dipropylene glycol, ethylene glycol, and diethylene glycol.

17. Method of claim 12 wherein the dehydration of step (a) is conducted at a temperature from about 180° C. to about 290° C. for about 45 minutes to about 90 minutes.

18. Method of claim 12 wherein the water-soluble dye solution of step (b) has a concentration of about 0.5% to about 3%.

19. Method of claim 12 wherein the alumina trihydrate in step (a) comprises particles of about 1 micron to about 1.27 cm.

20. A colored aluminum trihydrate made by the process of claim 12.

* * * * *

UNITED STATES PATENT AND TRADEMARK OFFICE
CERTIFICATE OF CORRECTION

PATENT NO. : 5,286,290

DATED : February 15, 1994

INVENTOR(S) : Lon F. Risley

It is certified that error appears in the above-identified patent and that said Letters Patent is hereby corrected as shown below:

Column 3, line 40, change "extend" to -- extent --.

Signed and Sealed this

Fourteenth Day of June, 1994

Attest:

BRUCE LEHMAN

Attesting Officer

Commissioner of Patents and Trademarks